Dec. 29, 1953 — K. D. CLAYSON — 2,664,021
SELF-RELEASING NUT STARTER
Filed Feb. 1, 1951 — 2 Sheets-Sheet 1
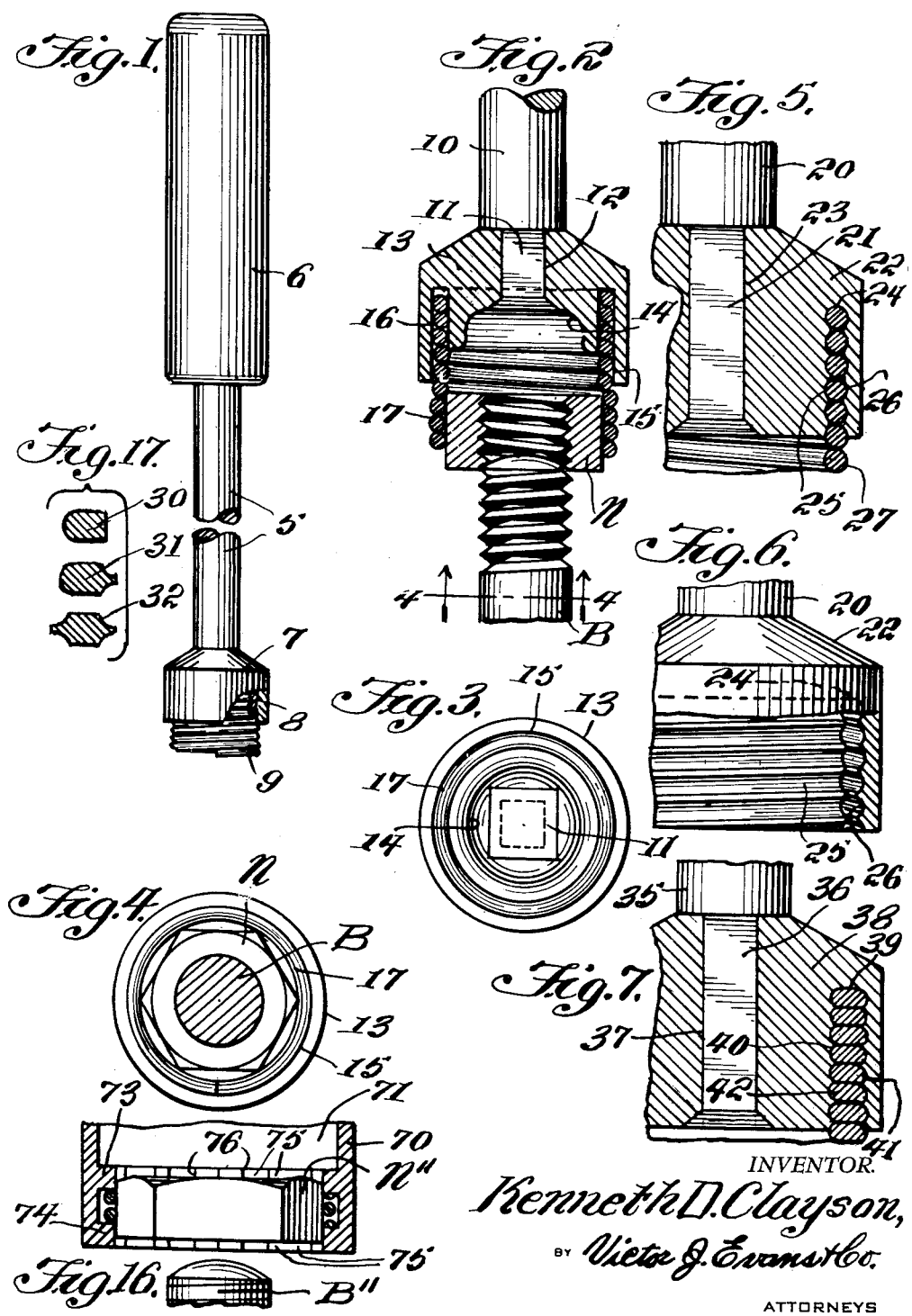
INVENTOR.
Kenneth D. Clayson,
BY Victor J. Evans & Co.
ATTORNEYS Dec. 29, 1953 K. D. CLAYSON 2,664,021
SELF-RELEASING NUT STARTER
Filed Feb. 1, 1951 2 Sheets-Sheet 2
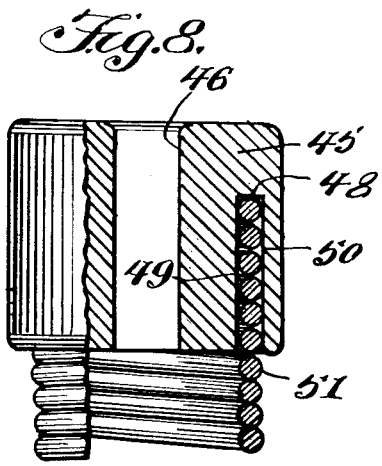
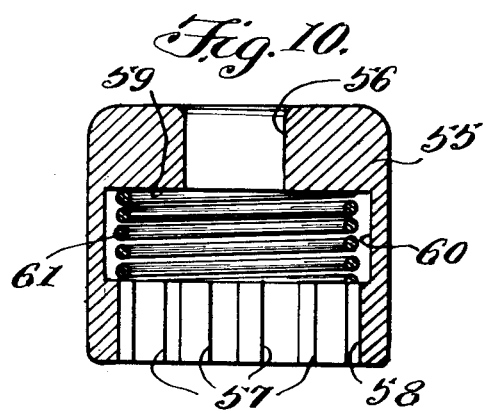
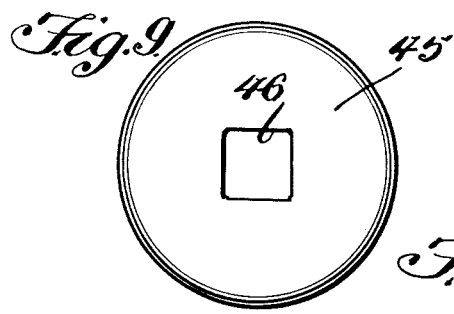
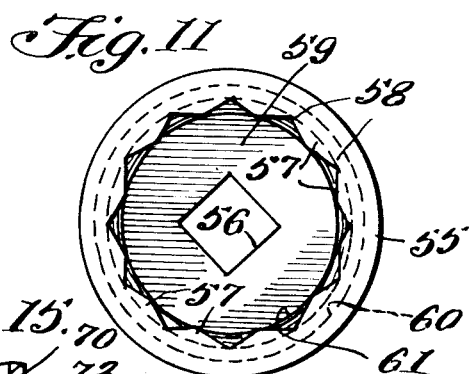
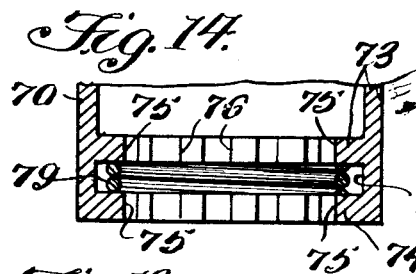
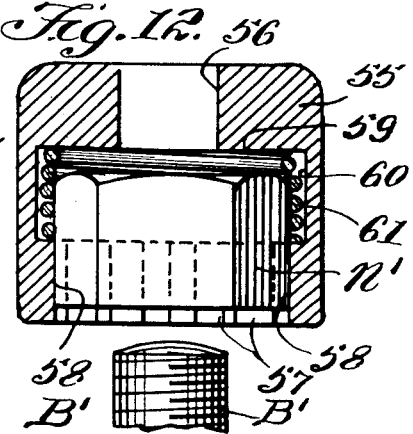
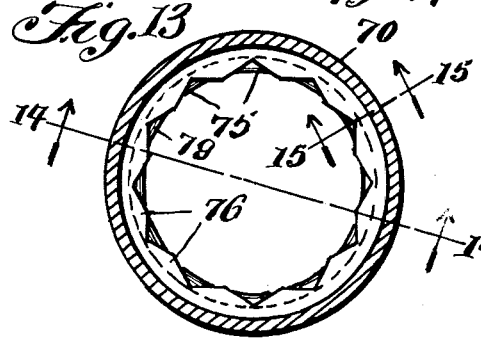
INVENTOR.
Kenneth D. Clayson,
BY Victor J. Evans & Co.
ATTORNEYS Patented Dec. 29, 1953

2,664,021

UNITED STATES PATENT OFFICE 2,664,021

SELF-RELEASING NUT STARTER

Kenneth D. Clayson, Butztown, Pa.

Application February 1, 1951, Serial No. 208,950

4 Claims. (Cl. 81—64)

The present invention relates to special tools for handling and positioning threaded fasteners, and more particularly to a self-releasing starter for threaded fasteners such as nuts and bolts having various types of square and polygonal shapes.

One object of the invention is to provide a tool for frictionally gripping and retaining a threaded fastener such as a nut or headed bolt to facilitate positioning of said threaded fastener with respect to a corresponding male or female threaded member to initiate the threading action and starting the threaded member on the corresponding threads of the other member.

Another object is to provide a tool for starting and initiating the threading of complementary threaded members in inaccessible locations or positions in various radio and television installations during repair or assembly, and where component parts of the assembly render it extremely difficult to start and place threaded members such as nuts and the like on various terminals and structural elements.

Another object is to provide a self-releasing nut and bolt starter for threaded fasteners having square and polygonal shapes which will frictionally grip the corner edges of the threaded fastener and yieldingly hold the same in position during the thread initiating or starting action.

Another object is to provide a self-releasing threaded fastener starter for initiating the coupling of threaded fasteners having a spiral friction gripping member for yieldingly and frictionally gripping the corner edges of square and polygonal nuts, cap screws and headed bolts in which the spiral convolutions of the coil spring are in a direction such that rotation in a right hand direction when applying a threaded fastener will cause the convolutions to more tightly and frictionally grip the threaded fastener and prevent the same from becoming displaced during the initial threading action.

Another object is to provide a self-releasing threaded fastener starter for socket-type wrenches having enclosed jaws for frictionally and yieldingly gripping the head of a threaded fastener or a nut to facilitate positioning and starting the initial threading action with a correspondingly threaded fastener.

Another object is to provide a self-releasing threaded fastener retaining device for frictionally gripping square and polygonal nuts, bolt heads and similar threaded fasteners in the cavity of a socket wrench having a nut receiving recess so that the threaded fastener will be yieldingly and frictionally held therein when applying the threaded fastener to a correspondingly threaded male or female member.

Another object is to provide a retaining device for frictionally gripping nuts and the heads of various shaped screws and bolts having a coil spring arranged such that the inner periphery of the coil spring convolutions will engage the corner edges of the nuts and bolts to provide mutually engaging circumferentially spaced gripping surfaces.

Other objects and advantages of the invention will become apparent during the course of the following description of the accompanying drawings wherein:

Figure 1 is a side elevational view of a self-releasing threaded fastener starter showing a portion thereof broken away to illustrate the manner in which the coil spring or friction gripping element is mounted therein.

Figure 2 is a vertical fragmentary cross-sectional view of a modified form of the invention showing a self-releasing threaded fastener starter having a removable handle, and illustrating the manner in which the coil spring is arranged to yieldingly and frictionally grip a threaded fastener such as a nut for initiating the threading action with relation to a bolt or stud.

Figure 3 is a bottom plan view of the form of the invention shown in Figure 2 illustrating the square opening in the body of the device for receiving the removable handle.

Figure 4 is a transverse cross-sectional view taken on line 4—4 of Figure 2 and looking in in the direction of the arrows to illustrate the manner in which the coil spring frictionally and yieldingly engages the corner edges of a nut of polygonal or hexagonal shape.

Figure 5 is a slightly enlarged fragmentary cross-sectional view of another modified form of the invention in which the head of the device is provided with an annular recess, the inner and outer walls of which are mutually threaded for receiving the threaded fastener gripping spring.

Figure 6 is a slightly enlarged fragmentary cross-sectional view of the form the invention shown in Figure 5.

Figure 7 is a fragmentary cross-sectional view of another modified form of the invention similar to Figure 5, but showing a spring formed of wire of flat or oval sectional shape.

Figure 8 is an enlarged fragmentary cross-sectional view of a still further modified form of the invention in which the body portion of the threaded fastener retaining member is provided with an annular recess having plain internal and external walls and showing the body provided with a square opening to receive a socket wrench or similar tool.

Figure 9 is a top plan view of the form of the invention shown in Figure 8, further showing the square opening in the body for receiving a socket wrench having a corresponding sectional shape.

Figure 10 is a diametral cross-sectional view of a still further modified form of the invention showing the threaded fastener gripping device applied to a socket wrench of the enclosed jaw type.

Figure 11 is a bottom plan view of the invention shown in Figure 10, illustrating the closed jaw faces for accommodating nuts of various dimensions and shapes and also showing the square opening in the body of the wrench for receiving a wrench handle.

Figure 12 is a diametral cross-sectional view of a socket wrench showing the manner in which the yielding spring is arranged in frictional engagement with a nut when the same is presented to a correspondingly threaded bolt or stud for being threaded thereon.

Figure 13 is a transverse cross-sectional view through a socket wrench designed for relatively thin nuts or bolts which have small heads.

Figure 14 is a diametral cross-sectional view taken on line 14—14 of Figure 13 and looking in the direction of the arrows to illustrate the manner in which the threaded fastener retention spring is mounted in the annular recess intermediate the ends of the enclosed jaw faces.

Figure 15 is a fragmentary cross-sectional view taken on the radial line 15—15 of Figure 13 and showing the manner in which the retenion device projects beyond the jaw faces of the wrench at certain spaced apart locations.

Figure 16 is a diametral cross-sectional view similar to Figure 14 and showing the manner in which a threaded fastener such as a hexagonal nut is releasably and frictionally held between the jaws of the socket wrench, and Figure 17 is a sectional view showing several different shapes of wire for making the spring member.

In the drawings, and more particularly Figure 1, there is shown one embodiment of the invention in which the self-releasing threaded fastener gripping tool is formed as a unit. The tool comprises an elongated shank 5 having a handle 6 at one end and a body portion of enlarged diameter 7 at the opposite end. The body portion 7 is circular or preferably round and is provided with an internal bore 8 which may be threaded if desired for receiving a coil spring 9. The coil spring 9 has its upper convolutions received in the cavity 8, and in the event that the wall of the cavity 8 is plain the coil spring 9 will be formed slightly larger in diameter than the internal diameter of the cavity 8 to retain the upper end of the coil spring 9 in place. The lower end of the coil spring 9 has its convolutions projecting beyond the head 7 or body and is arranged to receive a square or polygonal threaded fastener such as a nut or the head of a similarly shaped bolt.

In view of the fact that the coil spring 9 has a circular inner diameter the corner edges of the threaded fastener such as a nut or bolt head will be frictionally gripped within the coil spring at circumferentially spaced apart locations. It is intended to form the inner diameter of the coil spring 9 slightly smaller than the diameter from corner to corner of threaded fasteners so that the coil spring 9 will frictionally, releasably and yieldingly retain a threaded fastener in place when the same is presented to the corresponding threads of another threaded fastener. Thus, the tool may be used to start nuts and the like on the ends of bolts and studs or other threaded fastener elements and after the threaded fastener has been tightened in place, the tool may be removed and a wrench applied to turn the threaded fastener home.

In the modified form of the invention shown in Figures 2, 3 and 4, the tool comprises a shank 10 having a handle at one end as before and a lower squared portion 11. The squared portion 11 is adapted to be received in an opening 12 of corresponding shape in the body portion 13 of the tool, and the lower end of the body portion 13 is recessed to provide a cavity 14, having an enlarged mouth portion 15.

Extending inwardly in the mouth portion 15 is an annular cavity or recess 16 for receiving a coil spring 17 which has its upper convolutions frictionally held between the internal and external walls of the annular recess 16 as shown in Figure 2. The lower convolutions of the coil spring 17 project beyond the body 13 at the lower end thereof and portions thereof are exposed to the internal cavity 14. The coil spring 17 is formed to provide an internal diameter with the convolutions closely spaced slightly smaller than the outer diameter of the square or polygonal nut for which the device is intended. As shown in Figs. 2 and 4 the coil spring 17 has its lower convolutions in yielding frictional engagement with a nut N which is hexagonal in shape and hence, the nut corner edges engage the inner convolutions of the coil spring at circumferentially spaced apart locations providing mutually engaging friction surfaces. When the nut N is presented to the correspondingly threaded end of a bolt B and turned thereon the nut N will be started on the threads of the bolt B. The turning movement may continue until the friction between the coil spring 17 and the nut is overcome, after which the tool may be removed and a conventional socket wrench applied to seat the nut.

In the modified form of the invention shown in Figures 5 and 6, the self-releasing threaded fastener retainer comprises an elongated handle 20 having a handle on its upper end (not shown), and a reduced portion 21 of square section at its lower end. The tool includes a round body 22 as before having a central opening 23 corresponding in shape to the square projection 21 so that the body 22 may be removably held thereon.

Extending upwardly from one end of the round body 22 is an annular recess 24, the confronting convex and concave interior walls 25 and 26 of which are mutually threaded, for receiving the upper convolutions of a threaded fastener gripping spring 27 which has its convolutions closely spaced with the upper convolutions received between the mutually threaded internal and external walls 25 and 26 of the annular recess or channel 24, while its lower convolutions extend below the lower edge of the round body 22. In use, the device receives a nut so that the coil spring 27 will releasably and frictionally engage the corner edges to facilitate the initial starting when the threaded fastener is presented to a correspondingly threaded male member.

In the form of the invention shown in Figure 7, the tool embodies a removable handle 35 having a reduced squared portion 36 which is adapted to be received in a correspondingly shaped central opening 37 in the round body portion 38. The round body portion 38 is provided with an annular recess extending inwardly from the lower end thereof to provide external and internal opposite walls which are threaded, as at 40 and 41, for receiving the internal and external rounded portions of a coil spring 42. The coil spring 42 is formed of flattened wire with its convolutions in closely spaced relation, whereby the coil spring 42 may have its upper convolutions threadedly received in the external and internal threaded walls 40 and 41 of the annular cavity 39. The lower convolutions of the flattened coil spring 42 project beyond the lower end of the body portion 38 for frictionally gripping a nut or bolt head of a threaded fastener so that the same can be presented to a correspondingly threaded opposite member.

In the form of the invention shown in Figures 8 and 9 the round body portion 45 is provided with a central opening 46 of square shape (Fig. 9) for removably receiving one end of a socket wrench or handle having a corresponding cross-sectional shape. Extending inwardly from one end of the round body portion 45 is an annular recess 48 providing confronting convex and concave walls 49 and 50, respectively, for receiving the upper closely spaced convolutions of a threaded fastener gripping coil spring 51. The confronting walls 49 and 50 of the annular recess or cavity 48 may be radially spaced a distance slightly less than the cross-sectional diameter of the coil spring convolutions so that the upper convolutions of the coil spring will be frictionally held in place, while the lower convolutions project beyond the lower end of the round body 45 for frictionally and yieldingly gripping the corner edges of a threaded fastener head or nut.

In the form of the invention shown in Figures 10, 11 and 12 the invention is applied to a socket-type or closed jaw wrench, and as before includes a round body portion 55 having a central opening 56 which is square in shape to receive a socket wrench handle of corresponding cross-section. Extending upwardly and inwardly of the body portion 55 is a cavity provided with a plurality of angular facets 57 which are arranged in circumferentially spaced apart relation to provide jaw portions 58 (Fig. 11) for receiving the corner edges of a threaded fastener head or nut. The facets 57 extend for a portion of their length into the cavity 59 in the body portion 55 and said cavity is enlarged as at 60 to form an annular recess for receiving a nut gripping helical coil spring 61. The convolutions of the coil spring 61 are closely spaced and are arranged to frictionally engage the corner edges of a threaded fastener head or nut so as to frictionally and releasably retain the threaded fastener with its corner edges engaged by the jaw faces 58, while the threaded fastener is being presented to an opposite correspondingly threaded fastener. In use, a hexagonal or square nut is placed in the socket 59 with its corner edges engaged by both the jaw faces of the socket wrench and the inner periphery of the coil spring convolutions to retain the nut in place. In Figure 12, the nut N' is illustrated as being frictionally held in the socket 59 with the upper portion of the hexagonal nut engaged by the coil spring, and the lower portion engaged by the circumferentially spaced apart jaw faces 57. When the socket wrench 55 is applied to a bolt B' the nut N' will be held in the socket wrench and by turning the same in the usual manner, said nut will be threaded on the bolt B' and tightly seated thereon. As the nut moves down the bolt, it also moves axially outward with respect to the socket wrench 55, and is thus forced out of the coil spring 61, which automatically releases its gripping frictional engagement with the corner edges of the nut.

In the form of the invention shown in Figures 13 to 16 inclusive, the invention is illustrated as applied to a socket wrench having closed jaws of a relatively shallow depth for accommodating nuts or threaded fasteners of relatively thin section. The tool comprises a socket wrench body 70 having a central cavity 71 similar to the cavity 59 in Figure 10. The body portion 70 is likewise round and is provided with a central square opening (not shown) for receiving a socket wrench handle. The lower portion of the internal cavity 71 is provided with spaced apart upper and lower inwardly extending flanges 73 and 74 which are provided with a series of angular facets 75 to form nut engaging jaws 76. The space between the annular inwardly directed flanges 73 and 74 provides an annular recess 78 for receiving a coil spring 79, the internal convolution diameter of which is slightly less than the seats of the jaw faces 75. Thus, jaw faces are provided on opposite sides of the helical nut engaging coil spring 79 to frictionally retain a nut N'' when the same is presented to a correspondingly threaded bolt or stud B''. When the nut N'' is received in the socket wrench body 70, the upper and lower faces of the nut are engaged by the jaw faces 75 at the corner areas, and the corners of the nut N'' are frictionally and yieldingly engaged by the helical coil spring 79 so as to retain the nut in position while the same is being presented to a correspondingly threaded bolt or stud B'' for being threaded thereon (Fig. 16).

In all forms of the invention the helical spring is arranged in an annular recess in the body portion of the tool so that the inner convolutions of the helical coil spring will engage the corner edges of a square or polygonal nut, machine bolt head or the like, so as to frictionally grip the threaded fastener when applied to an opposite threaded fastener having corresponding threads and thus initiate the coupling threading action between said threaded fasteners.

In the form of the invention shown in Figure 17, there is shown several alternative shapes for the wire used in making the spring member. Thus, the numeral 30 indicates a piece of wire which is flat on three sides and round on one end. Further, the numeral 31 designates a portion of wire stock which is pointed on one end, and which has a flat top and bottom and one rounded end. Finally, the numeral 32 indicates a piece of wire stock which is pointed on two ends and which has a flat top and bottom. In other words, the wire for making the spring could be of any desired shape. Further, the shape of the spring itself would not necessarily have to be round, since it could correspond to the shape of the head of the fastener with which it is designed to be used. Further, the invention can be made without or with a skirt, as desired.

It is to be understood that the forms of the invention shown and described in the accompanying drawings and specification are to be taken as preferred embodiments thereof, and that various changes in the shape, size and arrangement of parts may be resorted to without departing from the spirit of the invention or the scope of the subjoined claims. The tool of the present invention is self-releasing because after the nut has been applied to the bolt, continued manual rotation of the tool will cause the spring member to automatically become disengaged from the nut whereby the spring is self-releasing.

I claim:

1. In a tool for applying threaded fasteners in inaccessible locations, a shank, a handle on one end of said shank, a head removably affixed to the other end of the shank, said head having spaced and confronting interior walls forming an axially extending annular recess, a helical coil spring having its upper convolutions received in said annular recess and its lower convolutions extending beyond said recess to yieldingly and frictionally engage the corner edges of nuts and the heads of other threaded fasteners, the confronting walls of said recess being provided with mutually arranged threads for threadedly receiving said coil spring.

2. In a tool for applying threaded fasteners in inaccessible locations, a shank, a handle on one end of the shank, a head on the opposite end of the shank, said head having an interior wall forming an axially extending opening and a helical coil spring having some of its convolutions positioned in said opening and contacting said interior wall, said spring having its axis coincident with the shank axis, other convolutions of said spring projecting beyond said opening for yieldingly and frictionally engaging the corner edges of threaded fasteners such as nuts and the like to hold the same in proper position when applied to threaded fasteners of the opposite type, the interior wall of said opening being internally threaded to threadedly receive the helical convolutions of said coil spring in contact therewith.

3. In a tool for applying threaded fasteners in inaccessible locations, a shank, a tool head on said shank, said tool head having spaced and confronting interior walls forming an annular recess extending inwardly from one end thereof, the confronting and interior walls of said recess being mutually threaded, and a helical coil spring formed of wire of flat section having some of its convolutions threadedly received in said recess and having the remainder of its convolutions projecting from the tool head to yieldingly and frictionally engage the corner edges of nuts and the heads of other threaded fasteners during the positioning thereof.

4. In a tool for applying threaded fasteners in inaccessible locations, a shank, a tool head having a square opening in one end for receiving a correspondingly shaped portion of said shank, said tool head being provided with spaced and confronting interior walls forming an annular recess extending inwardly from the other end thereof, and a helical coil spring having its convolutions frictionally held in said recess adjacent one end of said spring and its other convolutions projecting from said head to yieldingly and frictionally engage the corner edges of nuts and the heads of other threaded fasteners while positioning the same.

KENNETH D. CLAYSON.

References Cited in the file of this patent

UNITED STATES PATENTS

| Number | Name | Date |
|---|---|---|
| 211,918 | Lombard | Feb. 4, 1879 |
| 985,817 | Lower | Mar. 7, 1911 |
| 1,488,217 | Prestek | Mar. 25, 1924 |
| 1,537,929 | Lee | May 12, 1925 |
| 1,722,519 | Du Chene | July 30, 1929 |

FOREIGN PATENTS

| Number | Country | Date |
|---|---|---|
| 256,493 | Great Britain | Aug. 12, 1926 |